US012710924B2

(12) United States Patent
Tseng et al.

(10) Patent No.: US 12,710,924 B2
(45) Date of Patent: Aug. 18, 2026

(54) FLOATING-POINT ADDER WITH IN-PATH SUBNORMAL HANDLING

(71) Applicant: CENTREON CORPORATION, Apia (WS)

(72) Inventors: Kuo-Tseng Tseng, San Jose, CA (US); Parkson Wong, Los Altos, CA (US); Benjamin Ou, San Jose, CA (US)

(73) Assignee: CENTREON CORPORATION, Apia (WS)

( * ) Notice: Subject to any disclaimer, the term of this patent is extended or adjusted under 35 U.S.C. 154(b) by 1185 days.

(21) Appl. No.: 17/689,351

(22) Filed: Mar. 8, 2022

(65) Prior Publication Data

US 2023/0289140 A1 Sep. 14, 2023

(51) Int. Cl.
*G06F 7/485* (2006.01)

(52) U.S. Cl.
CPC .................................... *G06F 7/485* (2013.01)

(58) Field of Classification Search
CPC ...................................................... G06F 7/485
See application file for complete search history.

(56) References Cited

U.S. PATENT DOCUMENTS 8,965,945 B2 2/2015 Lutz
9,009,208 B2 4/2015 Nystad
10,055,195 B2 8/2018 Langahmmer
10,108,398 B2 10/2018 Quinnell
2003/0055859 A1 3/2003 Seidel et al.
2013/0007084 A1* 1/2013 Nystad ................ G06F 7/49942 708/499
2015/0142864 A1* 5/2015 Quinnell .................. G06F 7/50 708/505
2019/0079728 A1* 3/2019 Langhammer ... H03K 19/17744

* cited by examiner

*Primary Examiner* — Andrew Caldwell
(74) *Attorney, Agent, or Firm* — Maschoff Brennan

(57) ABSTRACT

An adder circuitry for adding two floating-point operands is provided. The first operand includes a first exponent and a first mantissa, the second operand includes a second exponent and a second mantissa. The adder circuitry includes a least significant bit (LSB) handler, an exponent subtractor, a near-path logic circuit, a far-path logic circuit, and a selection logic circuit. The LSB handler generates an LSB result to reflect whether LSBs of the first and second exponent are identical. The exponent subtractor computing an exponent difference between the first and second exponent. The near-path logic circuit computes a near-path result according to the first and second mantissa. The far-path logic circuit computes a far-path result according to the exponent difference, the first mantissa and the second mantissa. The selection logic circuit selects one of the near-path result and the far-path result according to the exponent difference.

10 Claims, 10 Drawing Sheets

FLOATING-POINT ADDER WITH IN-PATH SUBNORMAL HANDLING

BACKGROUND

1. Technical Field

This disclosure relates to floating-point computation, and more particularly to addition whose floating-point numbers have close exponents or subnormal operands.

2. Related Art

In general, a floating-point number is represented approximately with a fixed number of significant digits (or "mantissa") and scaled with an exponent. In the art of hardware computation of floating-point numbers, there exists a standard high-level approach to addition, including steps such as exponent comparison, mantissa alignment, mantissa addition, and result normalization, etc. The overall delay of a naive implementation is three full adder delays and one variable shift delay.

However, a full addition is a relatively expensive operation, and variable shifts are expensive as well. Marginal latency improvements to any of these steps are important in the state of the art for achieving low-cycle latency given modern clock rates, which can be considered relatively fixed for a given processor architecture due to needing to accommodate the critical path delay of the entire processor. If an existing execution unit such as a floating-point adder can have its latency reduced, even if only by a few gate delays, it may be able to execute in fewer pipelined cycles if those few gate delays kept the unit's entire latency above a critical threshold.

One potential source of delay is a class of inputs that presents various difficulties for floating-point adders: subnormal inputs. As defined by IEEE Standard for Floating-Point Arithmetic (IEEE 754), subnormal numbers are values with an exponent field of all zeros and a fraction field of nonzero. Most floating-point numbers are interpreted with an "implicit one" to the left of the leftmost mantissa bit; subnormal numbers instead have an "implicit zero". Therefore, one can identify a subnormal number by examining its exponent field. In hardware, one can tell a set of bits is all zeros simply by ORing them all together (also known as a reductive OR). A standard way to handle subnormal numbers in hardware is to concatenate the reductive OR of the exponent bits to the left of the mantissa bits. However, this standard way of handling subnormal numbers results in a delay equal to the reductive OR latency before mantissa addition can begin; the wider the bit width of the exponent field is, the longer the delay is.

SUMMARY

In view of the above, the present disclosure describes a floating-point adder which incorporates sufficient marginal latency reductions to achieve reduced-cycle execution.

According to an embodiment of the present disclosure, an adder circuitry for adding a first operand and a second operand is proposed. The first operand comprises a first exponent and a first mantissa, the second operand comprises a second exponent and a second mantissa. The adder circuitry comprises a least significant bit (LSB) handler, an exponent subtractor, a near-path logic circuit, a far-path logic circuit, and a selection logic circuit. The LSB handler receives the first exponent and the second exponent for generating an LSB result according to least significant bits of the first exponent and the second exponent. The exponent subtractor receives the first exponent and the second exponent for computing an exponent difference between the first exponent and the second exponent. The near-path logic circuit is coupled to the LSB handler, and receives the first mantissa and the second mantissa for computing a near-path result according to the first mantissa and the second mantissa. The far-path logic circuit is coupled to the exponent subtractor for receiving the exponent difference and receives the first mantissa and the second mantissa. The far-path logic circuit computes a far-path result according to the exponent difference, the first mantissa and the second mantissa. The selection logic circuit is coupled to the exponent subtractor, the near-path logic circuit, and the far-path logic circuit for receiving the exponent difference, the near-path result and the far-path result. The selection logic circuit selects one of the near-path result and the far-path result as an adder output according to the exponent difference.

According to an embodiment of the present disclosure, an adder circuitry for adding a first operand and a second operand is proposed. The first operand comprises a first exponent and a first mantissa, the second operand comprises a second exponent and a second mantissa. The adder circuitry comprises an exponent subtractor, a near-path logic circuit, a far-path logic circuit, and a selection logic circuit. The exponent subtractor receives the first exponent and the second exponent for computing an exponent difference between the first exponent and the second exponent. The near-path logic circuit is coupled to the exponent subtractor for receiving the exponent difference, and receives the first mantissa and the second mantissa for computing a near-path result according to the exponent difference, the first mantissa and the second mantissa. The far-path logic circuit is coupled to the exponent subtractor for receiving the exponent difference, receives the first mantissa and the second mantissa for computing a far-path result according to the exponent difference, the first mantissa and the second mantissa. The selection logic is coupled to the exponent subtractor for receiving the exponent difference, is coupled to the near-path logic circuit and the far-path logic circuit for receiving the near-path result and the far-path result, and selects one of the near-path result and the far-path result as an adder output according to the exponent difference.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

In the present disclosure, the proposed adder circuitry includes a first embodiment and a second embodiment. The first embodiment is illustrated with FIGS. 1-3*b*, and the second embodiment is illustrated with FIGS. 4-7*b*. Each embodiment deals with two aspects. FIGS. 1-2 and FIGS. 4-5 relate to the first aspect of respective embodiment. FIGS. 3-3*a* and FIGS. 6*a*-7*b* relate to the second aspect of respective embodiment.

First Embodiment

The first aspect of the first embodiment concerns fast exponent difference determination. In particular, in the context of a floating-point addition in hardware which adds two operands, each operand having a mantissa and an exponent for scaling, the fast exponent difference refers to the quick determination of the difference of the operand exponents.

Figure 1:
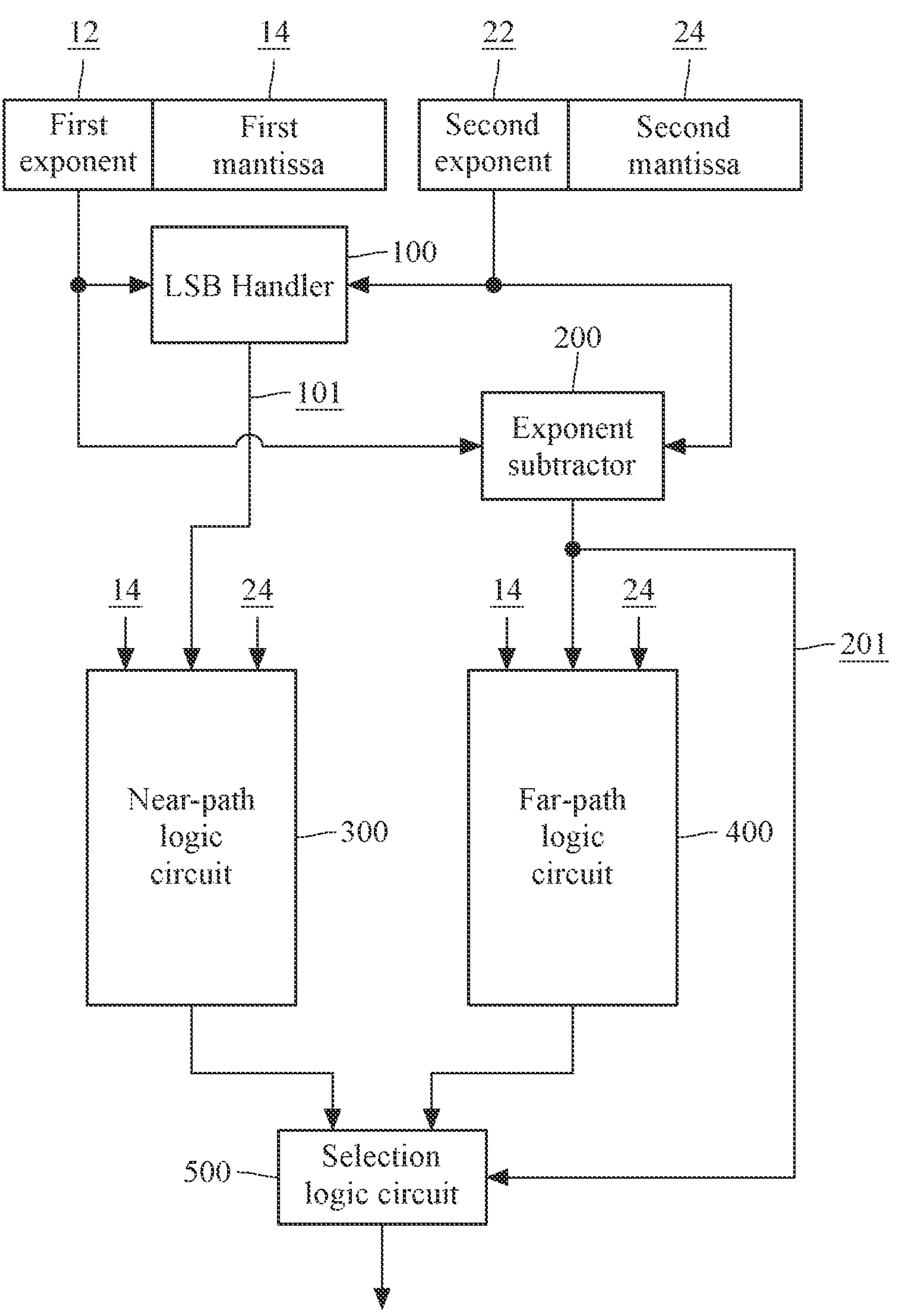
FIG. 1 is the block diagram of the adder circuitry according to the first embodiment of the present disclosure.

FIG. 1 is the block diagram of the adder circuitry according to the first embodiment of the present disclosure. In the first embodiment, the adder circuitry is suitable for adding the first operand and the second operand, wherein the first operand includes the first exponent 12 and the first mantissa 14, and the second operand includes the second exponent 22 and the second mantissa 24. The adder circuitry includes a least significant bit (LSB) handler 100, an exponent subtractor 200, a near-path logic circuit 300, a far-path logic circuit 400, and a selection logic circuit 500.

The LSB handler 100 receives the first exponent 12 and the second exponent 22 for generating the LSB result 101 according to the least significant bits of the first exponent 12 and the second exponent 22. In other words, the LSB handler 100 examines only the LSBs of the operand exponents. This allows for a fast determination of the absolute difference: if the bits match, then the difference is zero; if the bits do not match, then the difference is one. In an example, the LSB handler 100 includes an exclusive or (XOR) gate that generates the shifting flag as the LSB result 101 by performing an XOR operation upon the least significant bits of the first exponent 12 and the second exponent 22. In another example, the LSB handler 100 includes the comparator that generates the shifting flag as the LSB result by comparing the least significant bits of the first exponent 12 and the second exponent 22. The present disclosure does not limit other hardware configurations of gates that replicate the functionality of an XOR gate.

The exponent subtractor 200 receives the first exponent 12 and the second exponent 22 for computing an exponent difference 201 between the first exponent 12 and the second exponent 22. The exponent subtractor 200 and the LSB handler 100 are executed in parallel; since only the far-path logic circuit 400 needs the exponent difference 201 as input, the latency of the exponent subtractor 200 does not affect the near-path processing.

The near-path logic circuit 300 couples to the LSB handler 100 for receiving the LSB result 101, and receives the first mantissa 14 and the second mantissa 24 for computing a near-path result according to the first mantissa 14 and the second mantissa 24.

In the first embodiment, the near-path logic circuit 300, being defined for exponent differences 201 of exactly 0 or 1, does not need to receive the full exponent subtraction. All it needs to know is whether the first exponent 12 and the second exponent 22 are identical or not-which is known from the LSB result 101. Of course, the actual difference taking into account higher-significance bits could be much higher than one—in that case, the correct result will go through the path of the exponent subtractor 200 and the far path, so the near path is irrelevant.

The far-path logic circuit 400 couples to the exponent subtractor 200 for receiving the exponent difference 201, and receives the first mantissa 14 and the second mantissa 24. The far-path logic circuit 400 computes the far-path result according to the exponent difference 201, the first mantissa 14 and the second mantissa 24. The far-path result is associated with an addition of the first mantissa 14 and the second mantissa 24, and at least one of the first mantissa 14 and the second mantissa 24 is shifted according the value of the exponent difference 201.

In this embodiment, the near-path logic circuit 300 and the far-path logic circuit 400 form a parallel scheme handling the following cases of operands: (1) same sign, any exponents; (2) different signs, same exponent; and (3) different signs, different exponents. Case 3 is further comprised of two sub-cases: (3a) exponent difference greater than 1; and (3b) exponent difference exactly 1 or −1. The far-path logic circuit 400 handles cases 1 and 3a, and the near-path logic circuit 300 handles cases 2 and 3b. Case (3b) requires special handling because of the possibility of "massive cancellation". The massive cancellation problem is exclusive to subtraction, so the near-path logic circuit 300 handles subtractions only, with exponents that are equal or exactly 1 apart. Meanwhile, the far-path logic circuit 400 handles subtractions with all remaining exponent differences as well as additions.

The selection logic circuit 500 couples to the exponent subtractor 200, the near-path logic circuit 300, and the far-path logic circuit 400 for receiving the exponent difference 201, the near-path result and the far-path result. The selection logic circuit 500 selects one of the near-path result and the far-path result as the adder output according to the exponent difference 201. The near-path result is served as the adder output when the exponent difference 201 is 0, −1, or 1, and the far-path result is served as the adder output when the exponent difference 201 is any value other than 0, −1, or 1.

Figure 2:
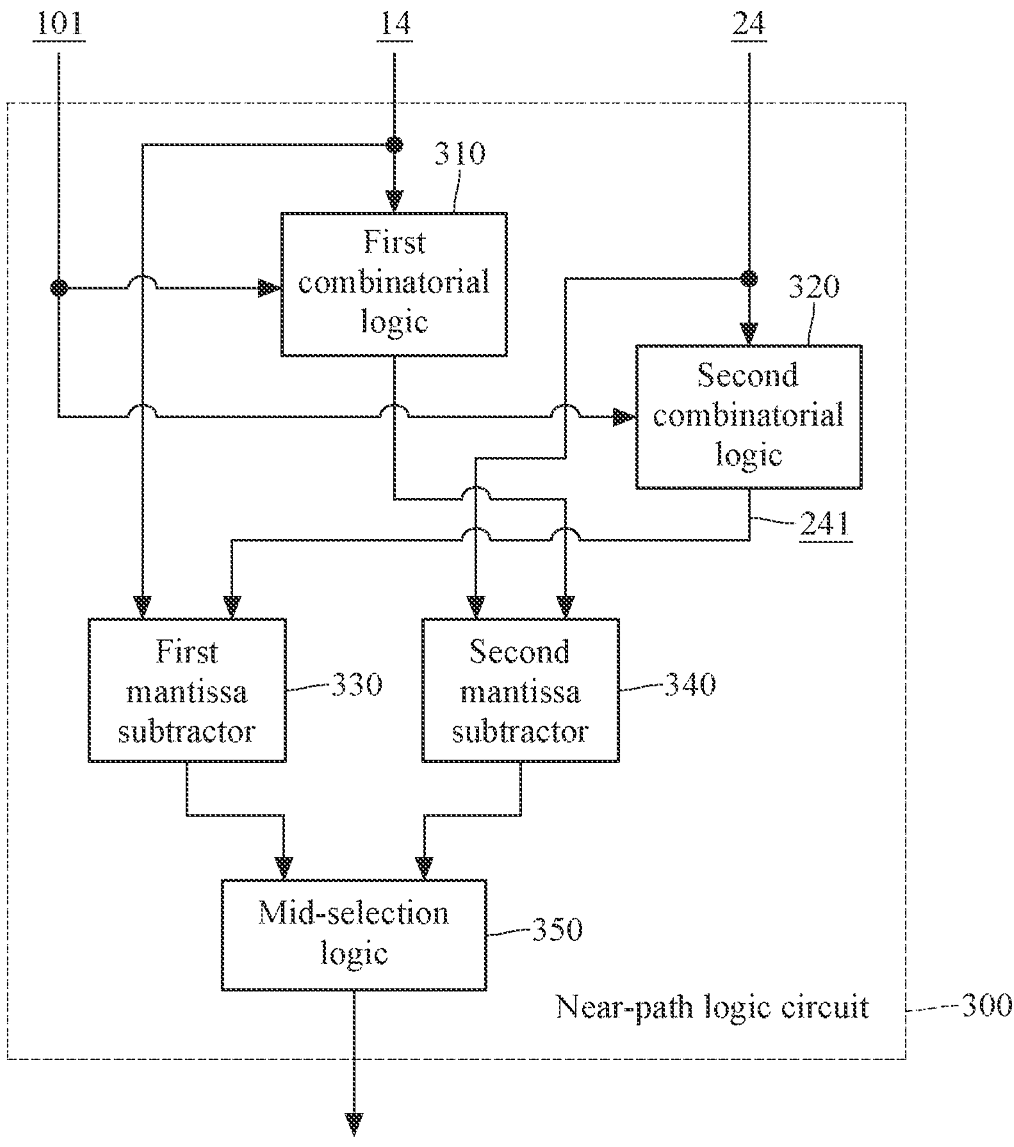
FIG. 2 shows the internal structure of the near-path logic circuit according to the first embodiment of the present disclosure.

FIG. 2 shows the internal structure of the near-path logic circuit 300 according to the first embodiment of the present disclosure. The near-path logic circuit 300 includes a first combinatorial logic 310, a second combinatorial logic 320, a first mantissa subtractor 330, a second mantissa subtractor 340, and a mid-selection logic 350.

The first combinatorial logic 310 couples to the LSB handler 100 for receiving the LSB result 101, and receives the first mantissa 14. The first combinatorial logic 310 outputs the first combinatorial result according to the LSB result 101, wherein the first combinatorial result is one of the first mantissa 14 and the shifted first mantissa. The first combinatorial result is the first mantissa 14 when the LSB result 101 is 0, whereas the first combinatorial result is the shifted first mantissa when the LSB result 101 is 1. The shifted first mantissa is generated by performing a one-bit right shifting operation upon the first mantissa 14.

The second combinatorial logic 320 couples to the LSB handler 100 for receiving the LSB result 101, and receives the second mantissa 24. The second combinatorial logic 320 outputs the second combinatorial result according to the LSB result 101, wherein the second combinatorial result is one of the second mantissa 24 and the shifted second mantissa. The second combinatorial result is the second mantissa 24 when the LSB result 101 is 0, whereas the second combinatorial result is the shifted second mantissa when the LSB result 101 is 1. The shifted second mantissa is generated by performing one-bit right shifting operation upon the second mantissa 24.

In short, both the first and second combinatorial logic 310, 320 perform 0-bit or 1-bit right shifting operations upon the first and second mantissa 14, 24 respectively and then output the shifted result, where the LSB result 101 is served as the shifting length. For example, the first and second combinatorial logic 310, 320 may be implemented with a hard-coded multiplexor that selects between the un-shifted and one-bit-shifted values.

The first mantissa subtractor 330 couples to the second combinatorial logic 320 for receiving the second combinatorial result, and receives the first mantissa 14. The first mantissa subtractor 330 computes the first mantissa difference according to the first mantissa 14 and the second combinatorial result.

The second mantissa subtractor 340 couples to the first combinatorial logic 310 for receiving the first combinatorial result, and receives the second mantissa 24. The second mantissa subtractor 340 computes the second mantissa difference between the second mantissa 24 and the first combinatorial result.

The mid-selection logic 350 couples to the first mantissa subtractor 330 and the second mantissa subtractor 340 for receiving the first mantissa difference and the second mantissa difference. The mid-selection logic 350 selects one of the first mantissa difference and the second mantissa difference as the near-path result. In an example, the mid-selection logic 350 selects a positive one among the first mantissa difference and the second mantissa difference as the near-path result.

Because the near-path processing does not reveal which operand is larger, the near-path logic circuit 300 uses parallel adders (i.e., mantissa subtractor 330, 340, note that the subtraction of two operands is equivalent to the addition of two operands with the subtractor operand converted into a 2's complement format) to account for both cases. Letting the first and second mantissa be A and B, the near-path logic circuit 300 configures two mantissa subtractors 330, 340 to compute A-B and B-A respectively; the path that outputs a positive answer is the one with the correct ordering of A and B.

The second aspect of the first embodiment concerns efficient subnormal handling. In IEEE 754, a subnormal number is a value with an exponent of all zeros and a mantissa of nonzero.

Figure 3A:
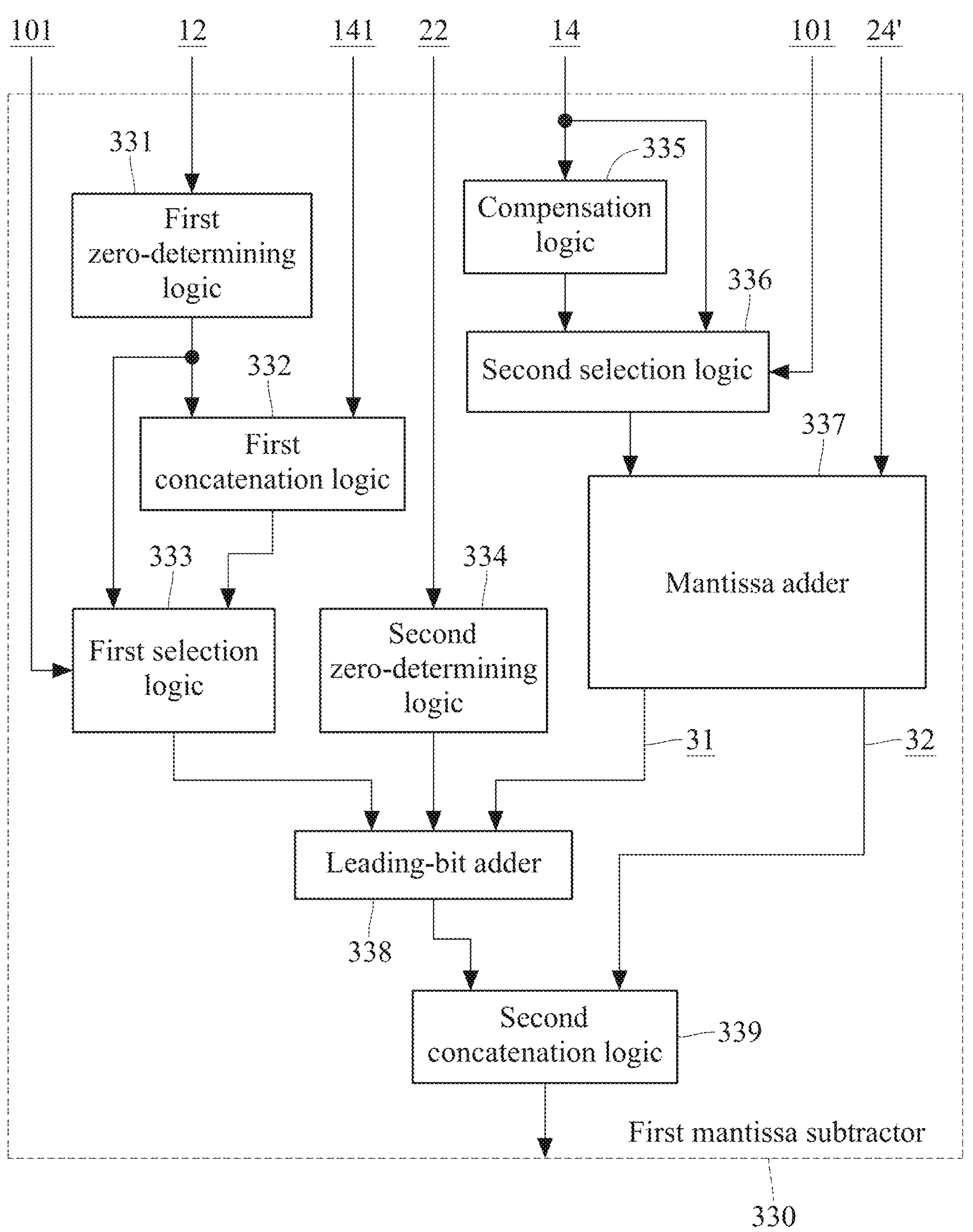
FIGS. 3*a*-3*b* show the internal structure of the mantissa subtractors.

FIG. 3*a* shows the internal structure of the first mantissa subtractor 330.

The first mantissa subtractor 330 includes a first zero-determining logic 331, a first concatenation logic 332, a first selection logic 333, a second zero-determining logic 334, a compensation logic 335, a second selection logic 336, a mantissa adder 337, a leading-bit adder 338, and a second concatenation logic 339.

The first zero-determining logic 331 is configured to receive the first exponent 12 and determine whether the first exponent 12 is zero, outputting a first determination flag.

The first concatenation logic 332 couples to the first zero-determining logic 331 to receive the first determination flag, and is configured to receive the most significant bit 141 (MSB 141) of the first mantissa 14, and integrate the first determination flag with the MSB 141 of the first mantissa 14 as a first concatenation result.

The first selection logic 333 couples to the first zero-determining logic 331 and the first concatenation logic 332 for receiving the first determination flag and the first concatenation result, and is configured to receive the LSB result 101 and to select one of the first determination flag and the first concatenation result as a first selection result according to the LSB result 101.

The second zero-determining logic 334 is configured to receive the second exponent 22, and determines whether the second exponent 22 is zero to output a second determination flag.

The compensation logic 335 is configured to receive the first mantissa 14 and outputs a compensation result, wherein the compensation result is a concatenation of a one-bit zero and a part of the first mantissa other than the MSB of the first mantissa 14.

The second selection logic 336 couples to the compensation logic 335 for receiving the compensation result, and is configured to receive the first mantissa 14 and the LSB result 101, wherein the second selection logic 336 selects one of the compensation result and the first mantissa 14 as the second selection result according to the LSB result 101.

The mantissa adder 337 couples to the second selection logic 336 for receiving the second selection result, and is configured to receive the second combinatorial result, and add the second selection result and the second combinatorial result to compute a mantissa addition result comprising a carry-out bit 31 and a plurality of sum bits 32.

The leading-bit adder 338 couples to the first selection logic 333, the second zero-determining logic 334, and the mantissa adder 337 for receiving the first selection result, the second determination flag and the carry-out bit 31, wherein the leading-bit adder 338 is configured to add up the first selection result, the second determination flag and the carry-out bit 31 to generate a leading-bit result.

The second concatenation logic 339 couples to the leading-bit adder 338 and the mantissa adder 337 for receiving the leading-bit result and the plurality of sum bits 32, and is configured to integrate the leading-bit result with the sum bits 32 as the first mantissa difference.

Figure 3B:
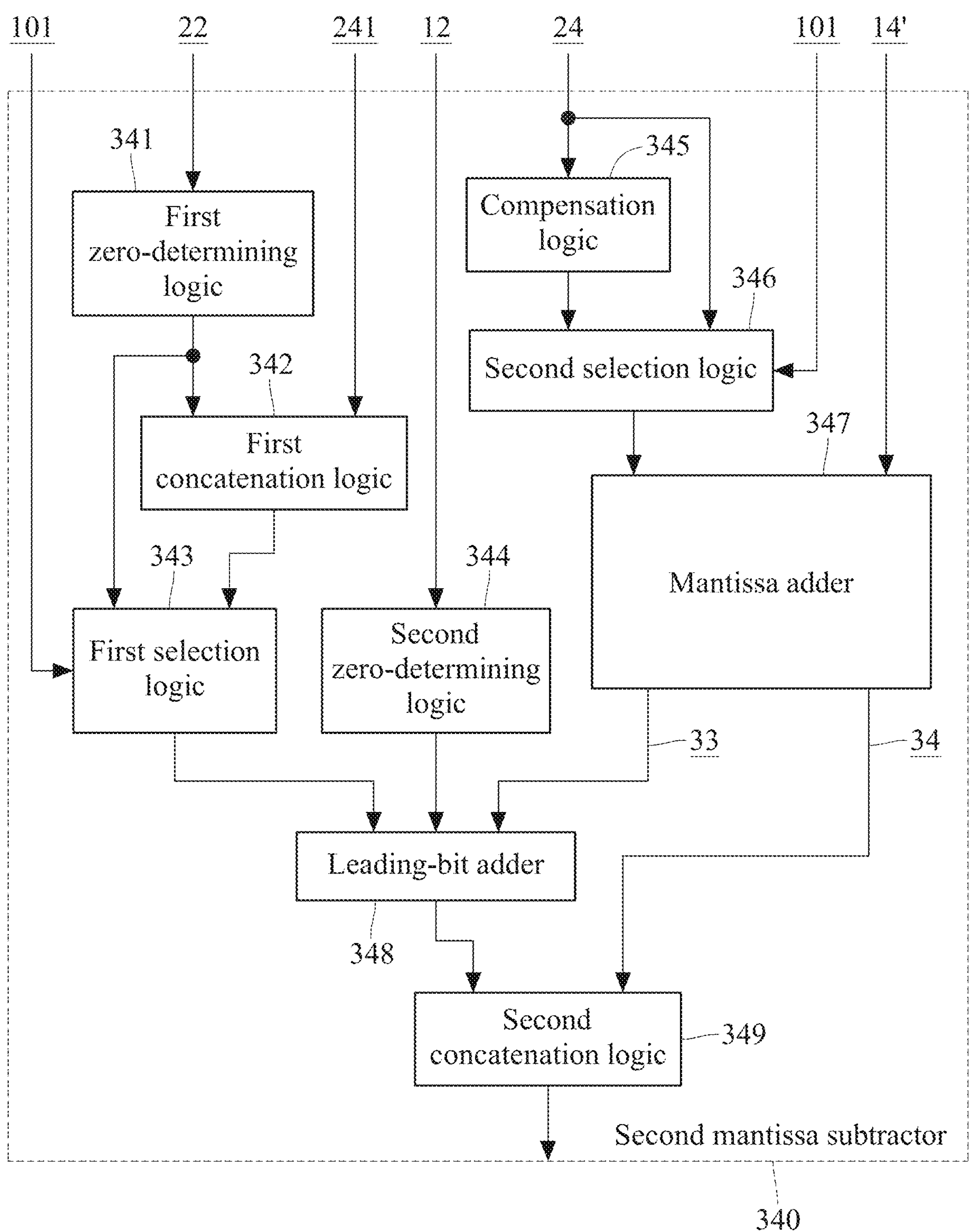

FIG. 3*b* shows the internal structure of the second mantissa subtractor 340. The internal structure of the second mantissa subtractor 340 may be referred to FIG. 3*a*, where the input signals of first/second operand need to be exchanged.

The second mantissa subtractor 340 includes a first zero-determining logic 341, a first concatenation logic 342, a first selection logic 343, a second zero-determining logic 344, a compensation logic 345, a second selection logic 346, a mantissa adder 347, a leading-bit adder 348, and a second concatenation logic 349.

The first zero-determining logic 341 is configured to receive the second exponent 22 and determine whether the second exponent 22 is zero, outputting a first determination flag.

The first concatenation logic 342 couples to the first zero-determining logic 341 to receive the first determination flag, and is configured to receive the MSB 241 of the second mantissa 24, and integrate the first determination flag with the MSB 241 of the second mantissa 24 as a first concatenation result.

The first selection logic 343 couples to the first zero-determining logic 341 and the first concatenation logic 342 for receiving the first determination flag and the first concatenation result, and is configured to receive the LSB result 101 and to select one of the first determination flag and the first concatenation result as a first selection result according to the LSB result 101.

The second zero-determining logic 344 is configured to receive the first exponent 12, and determines whether the first exponent 12 is zero to output a second determination flag.

The compensation logic 345 is configured to receive the second mantissa 24 and outputs a compensation result, wherein the compensation result is a concatenation of a one-bit zero and a part of the second mantissa other than the MSB of the second mantissa 24.

The second selection logic 346 couples to the compensation logic 345 for receiving the compensation result, and is configured to receive the second mantissa 24 and the LSB result 101, wherein the second selection logic 346 selects one of the compensation result and the second mantissa 24 as the second selection result according to the LSB result 101.

The mantissa adder 347 couples to the second selection logic 346 for receiving the second selection result, and is configured to receive the first combinatorial result, and add the second selection result and the second combinatorial result to compute a mantissa addition result comprising a carry-out bit 33 and a plurality of sum bits 34.

The leading-bit adder 348 couples to the first selection logic 343, the second zero-determining logic 344, and the mantissa adder 347 for receiving the first selection result, the second determination flag and the carry-out bit 33, wherein the leading-bit adder 348 is configured to add up the first selection result, the second determination flag and the carry-out bit 33 to generate a leading-bit result.

The second concatenation logic 349 couples to the leading-bit adder 348 and the mantissa adder 347 for receiving the leading-bit result and the plurality of sum bits 34, and is configured to integrate the leading-bit result with the sum bits 34 as the second mantissa difference.

Second Embodiment

The first aspect of the second embodiment concerns fast exponent difference determination.

Figure 4:
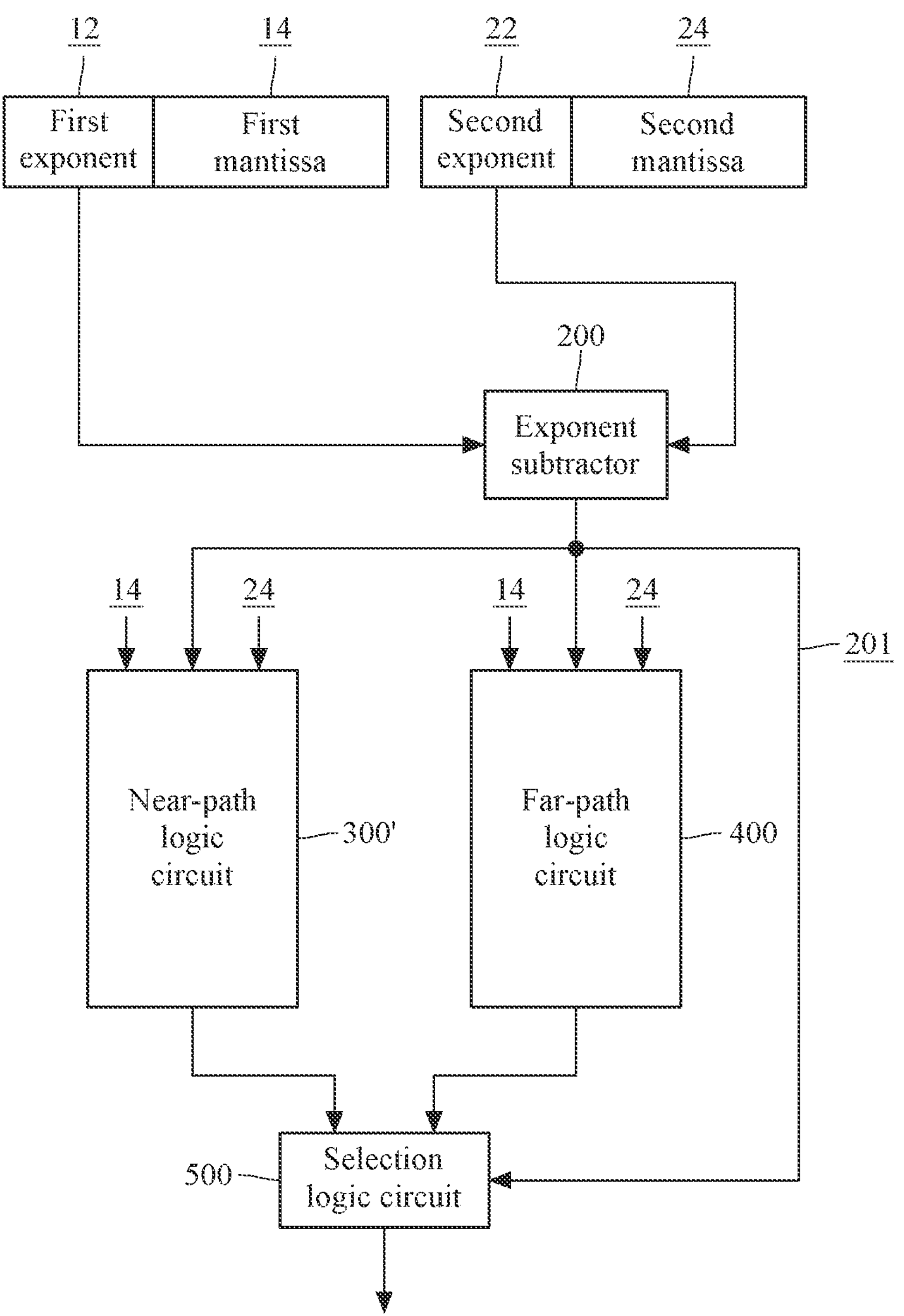
FIG. 4 is the block diagram of the adder circuitry according to the second embodiment of the present disclosure.

FIG. 4 is the block diagram of the adder circuitry according to the second embodiment of the present disclosure. In the second embodiment, the adder circuitry is once again suitable for adding the first operand and the second operand, wherein the first operand includes the first exponent 12 and the first mantissa 14, and the second operand includes the second exponent 22 and the second mantissa 24. The adder circuitry includes the exponent subtractor 200, the near-path logic circuit 300', the far-path logic circuit 400, and the selection logic circuit 500. Compared to the first embodiment, the second embodiment proposes a further parallelized structure for the near-path logic circuit 300', thus obviating the need for the LSB handler 100 and removing the XOR delay.

In FIG. 4, units such as the exponent subtractor 200, the far-path logic circuit 400, and the selection logic circuit 500 are identical to that of the first embodiment, and thus are not repeated again.

In FIG. 4, the near-path logic circuit 300' couples to the exponent subtractor 200 for receiving the exponent difference 201, and receives the first mantissa 14 and the second mantissa 24 to compute a near-path result according to the first mantissa 14 and the second mantissa 24.

Figure 5:
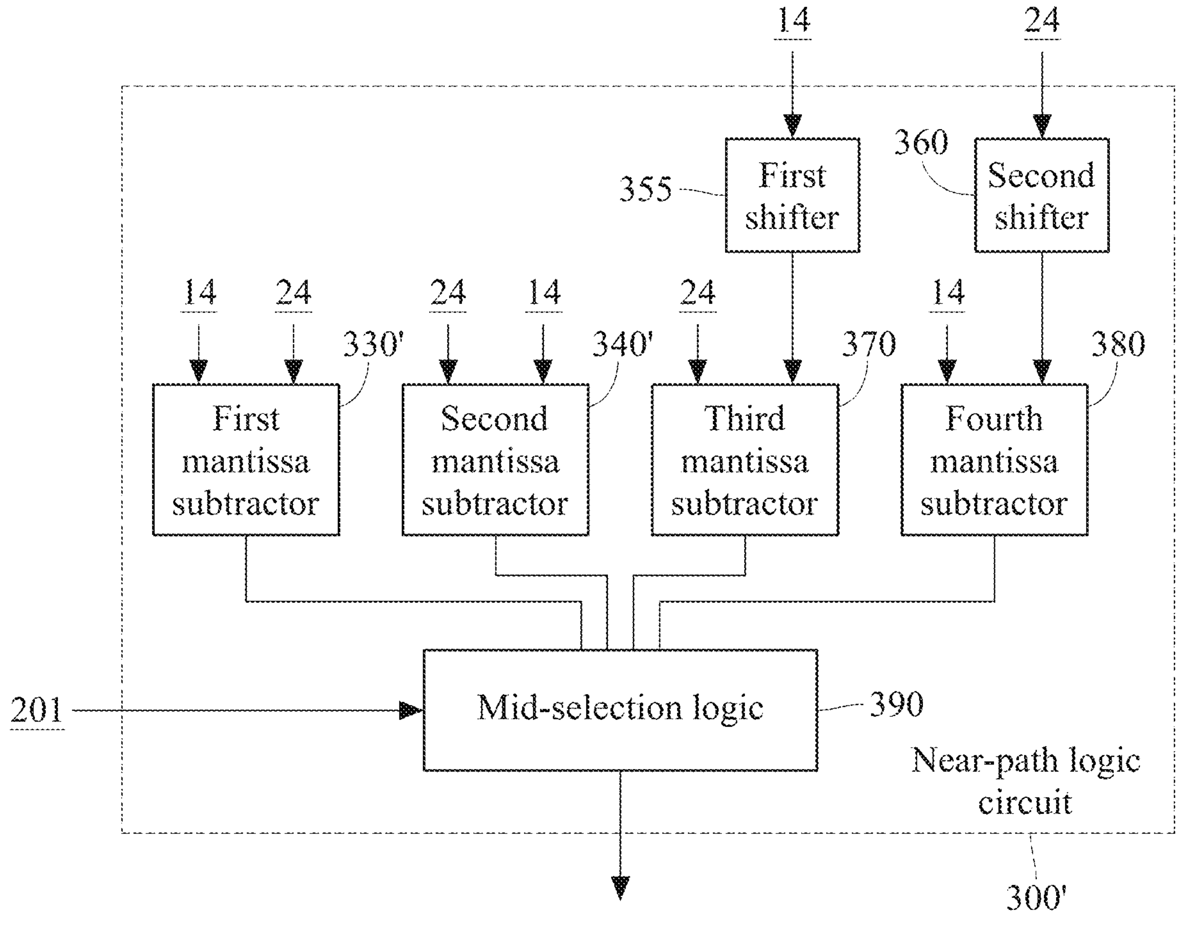
FIG. 5 shows the internal structure of the near-path logic circuit according to the second embodiment of the present disclosure.

FIG. 5 shows the internal structure of the near-path logic circuit 300' according to the second embodiment of the present disclosure. The near-path logic circuit 300' includes a first shifter 355, a second shifter 360, a first mantissa subtractor 330', a second mantissa subtractor 340', a third mantissa subtractor 370, and a fourth mantissa subtractor 380.

The first shifter 355 receives the first mantissa 14 and performs the shifting operation upon the first mantissa 14 to generate the first shifted result, wherein the direction of the shifting operation is a right-shift, and the shifting length is one bit.

The second shifter 360 receives the second mantissa 24 and performs the shifting operation upon the second mantissa 24 to generate the second shifted result, wherein the direction of the shifting operation is a right-shift, and the shifting length is one bit.

The first mantissa subtractor 330' receives the first mantissa 14 and the second mantissa 24, and computes the first subtraction result by subtracting the second mantissa 24 from the first mantissa 14.

The second mantissa subtractor 340' receives the second mantissa 24 and the first mantissa 14, and computes the second subtraction result by subtracting the first mantissa 14 from the second mantissa 24.

The third mantissa subtractor 370 receives the second mantissa 24 and the first shifted result, and computes the third subtraction result by subtracting the first shifted result from the second mantissa 24.

The fourth mantissa subtractor 380 receives the first mantissa 14 and the second shifted result, and computes the fourth subtraction result by subtracting the second shifted result from the first mantissa 14.

In sum, by using four subtractors 330', 340', 370, and 380, this near-path logic circuit 300' can handle the 0-bit alignment shift cases and the 1-bit alignment shift cases in parallel: the first mantissa subtractor 330' computes A-B with a 0-bit shift, the fourth mantissa subtractor 380 computes A-B with a 1-bit shift, the second mantissa subtractor 340' computes B-A with a 0-bit shift, and the third mantissa subtractor 370 computes B-A with a 1-bit shift.

In FIG. 2 and FIG. 5, the subtractor units subtract the right input from the left input.

In FIG. 5, the mid-selection logic 390 couples to the first mantissa subtractor 330', the second mantissa subtractor 340', the third mantissa subtractor 370, and the fourth mantissa subtractor 380 for receiving the first subtraction result, the second subtraction result, the third subtraction result, and the fourth subtraction result, wherein the mid-selection logic 390 selects one of the first subtraction result, the second subtraction result, the third subtraction result, and the fourth subtraction result.

In an example of the mid-selection logic 390, the mid-selection logic 390 performs the selection according to the exponent difference 201 and the value of the subtraction results. Specifically, when the exponent difference 201 is zero, the mid-selection logic 390 selects the positive one among the first subtraction result and the second subtraction result as the near-path result. If the exponent difference 201 is one, the mid-selection logic 390 selects one from the third subtraction result and the fourth subtraction result according to the first exponent and the second exponent. If the first exponent is larger than the second exponent, the fourth subtraction result is selected as the near-path result. If the second exponent is larger than the first exponent, the third subtraction result is selected as the near-path result. In practice, by the time the four subtraction results are available, the full exponent subtraction has already finished and can be used to select among the four subtraction results.

In another example of the mid-selection logic 390, the mid-selection logic 390 in FIG. 5 may be integrated with the selection logic circuit 500 in FIG. 4. The near-path result includes the first subtraction result, the second subtraction result, the third subtraction result, and the fourth subtraction result, and the selection logic circuit 500 selects one from the four subtraction results and the far-path result. In other words, all four subtraction results can be wired to the selection logic circuit 500 along with the far-path result to handle the entire selection at once. In this example, the near-path logic circuit 300' does not need to refer to the exponent difference 201, and the delay of the calculation of the exponent difference 201 is eliminated due to the parallel execution of exponent subtractor 200 and near-path logic circuit 300.

Referring to FIGS. 4-5 and examples of the mid-selection logic 390, the near-path logic circuit 300' does not make use of the exponent difference 201 when the shifters 355, 360 and the subtractors 330', 340', 370, 380 start execution, until the mid-selection logic 390 starts the selection. In the example where the mid-selection logic 390 is integrated with the selection logic circuit 500, it is workable for the near-path logic circuit 300' without using the exponent difference 201. In other words, there is not a full exponent subtraction latency before the near path, only before the far path. The exponent subtraction largely takes place in parallel with the near path computation.

In view of the above, one embodiment of the present disclosure examines only the LSBs of each exponent and compares them to determine the exponent difference, and performs parallel subtractions to handle not knowing which operand is bigger, which speeds up floating-point addition. Other embodiments also use further parallelization of the subtractions to avoid the LSB processing delay as well. This approach is novel since most approaches to floating-point addition simply perform the full exponent subtraction before both paths, so typically both paths know which operand is bigger.

The second aspect of the second embodiment concerns efficient subnormal handling.

Referring to subtractors shown in FIG. 5, these subtractors of the near-path logic circuit 300' assume the exponent difference 201 is either 0 or 1. The exponent difference 201 being 0 or 1 can be handled as separate cases, and FIG. 6*a*, FIG. 6*b*, FIG. 7*a*, and FIG. 7*b* show examples of the internal structure of the mantissa subtractor for each case. Note that the subtractor portrayed in FIG. 3*a* can also be used for all two subtractors 330' and 380, as the subtractor portrayed in FIG. 3*a* dynamically handles both cases, and the subtractor portrayed in FIG. 3*b* can also be used for all two subtractors 340' and 370, as the subtractor portrayed in FIG. 3*b* dynamically handles both cases. Note that the LSB result 101 shown in FIGS. 3*a* and 3*b* should be replaced by the least significant bit of the exponent difference 201. However, the subtractors portrayed in FIG. 6*a*, FIG. 6*b*, FIG. 7*a*, and FIG. 7*b* are advantageous in latency due to providing special handling for each case.

Figure 6A:
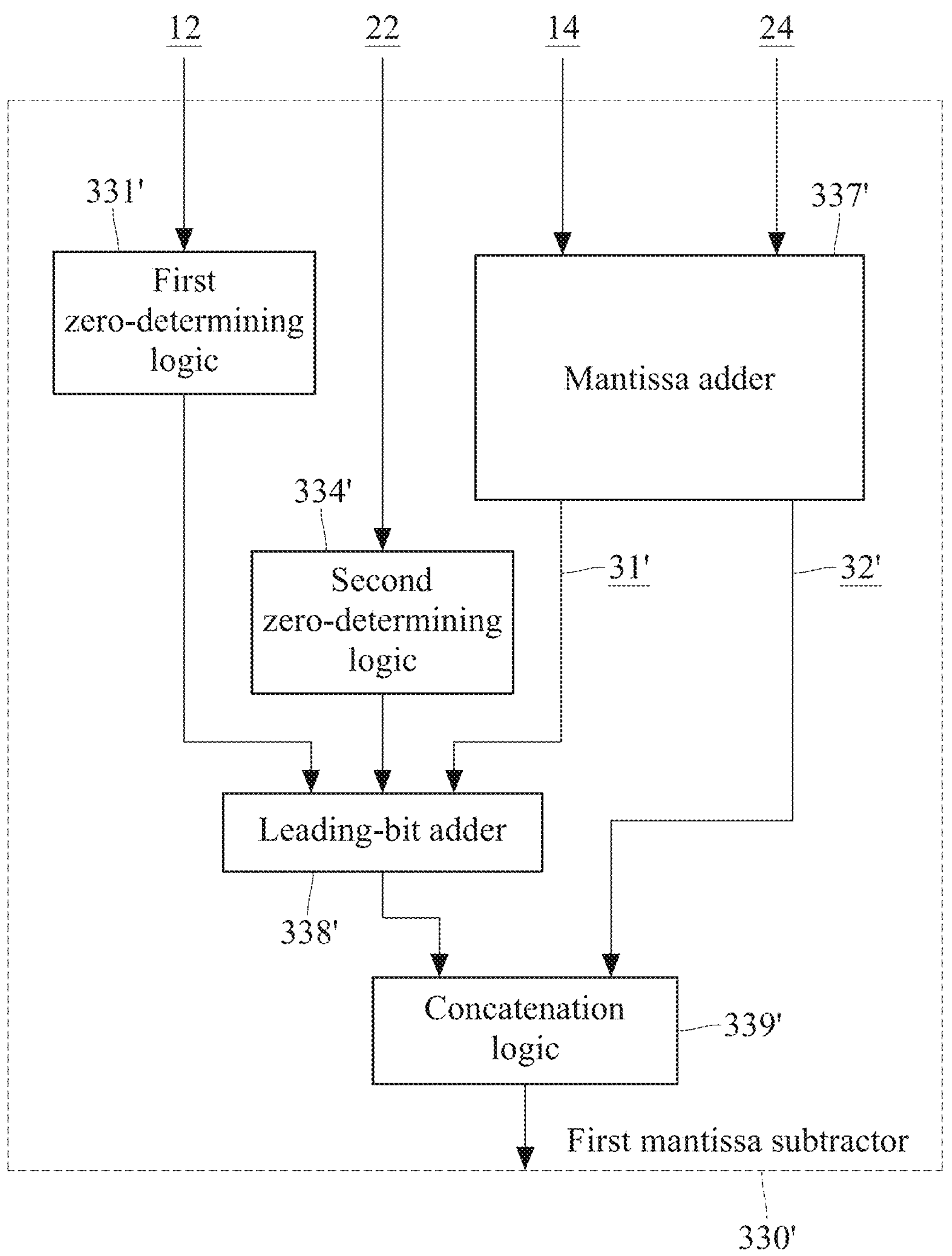
FIGS. 6*a*-6*b* and FIGS. 7*a*-7*b* show two types of the internal structure of the mantissa subtractors.
Figure 6B:
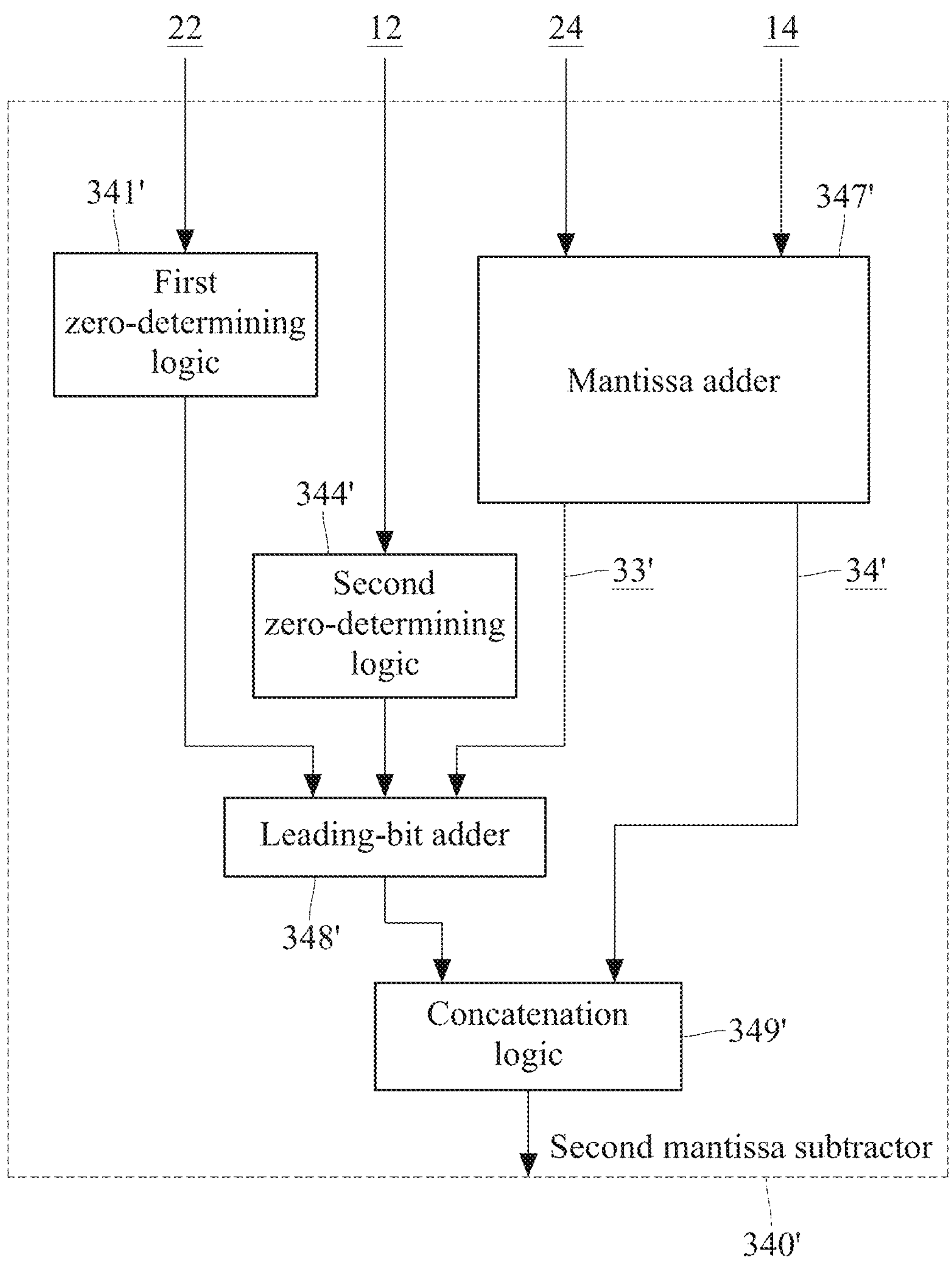

When the exponent difference 201 is 0, the first mantissa subtractor 330' and the second mantissa subtractor 340' may apply the design of FIG. 6*a* and FIG. 6*b*.

FIG. 6*a* shows the internal structure of the first mantissa subtractor 330'. In FIG. 6*a*, the first mantissa subtractor 330' includes a first zero-determining logic 331', a second zero-determining logic 334', a mantissa adder 337', a leading-bit adder 338', and a concatenation logic 339'.

The first zero-determining logic 331' receives the first exponent 12, and determines whether the first exponent 12 is zero to output the first determination flag. The first determination flag is 1 when at least one bit of the first exponent 12 is nonzero, and the first determination flag is zero when all bits of the first exponent 12 are zero.

The second zero-determining logic 334' receives the second exponent 22, and determine whether the second exponent 22 is zero to output the second determination flag.

The second determination flag is 1 when at least one bit of the second exponent 22 is nonzero, and the second determination flag is zero when all bits of the second exponent 22 are zero.

In some examples, both the first and second zero-determining logics 331', 334' perform the reductive OR operation upon the first and second exponents 12, 22 respectively.

The mantissa adder 337' receives the first input and the second input, and adds the first input to the second input to generate the mantissa addition result including the carry-out bit 31' and the plurality of sum bits 32'. The first mantissa 14 is served as the first input and the second mantissa 24 is served as the second input.

Note that the bit width of the mantissa adder 337' in FIG. 6*a* is one bit shorter than the bit width of each mantissa subtractor in FIG. 5. For example, in single precision, the mantissa subtractor in FIG. 5 performs a 24-bit subtraction, where the 24-bit operand is a concatenation of an implicit I/O of 1 bit and a fraction field of 23 bits; whereas the mantissa adder 337' in FIG. 6*a* performs a 23-bit addition, where the fraction field of 23 bits is served as the input exactly.

The leading-bit adder 338' couples to the first zero-determining logic 331', the second zero-determining logic 334' and the mantissa adder 337' for receiving the first determination flag, the second determination flag, and the carry-out bit 31'. The leading-bit adder 338' adds up the first determination flag, the second determination flag, and the carry-out bit 31' to generate the leading-bit result. In some examples, the leading-bit adder 338' is a full adder.

The concatenation logic 339' couples to the leading-bit adder 338' and the mantissa adder 337' for receiving the leading-bit result and the plurality of sum bits 32', and integrates the plurality of sum bits 32' with the leading-bit result. For example, the concatenation logic 339' may output a concatenation result of 25 bits, wherein the leading-bit result is served as the leftmost 2 bits, and the plurality of sum bits 32' is served the remaining 23 bits.

The internal structure of the second mantissa subtractor 340' may be referred to FIG. 6*a*, only the input signals of first/second operand needs to be exchanged). FIG. 6*b* shows the internal structure of the second mantissa subtractor 340'. In FIG. 6*a*, the second mantissa subtractor 340' includes a first zero-determining logic 341', a second zero-determining logic 344', a mantissa adder 347', a leading-bit adder 348', and a concatenation logic 349'.

The first zero-determining logic 341' receives the second exponent 22, and determines whether the second exponent 22 is zero to output the first determination flag. The first determination flag is 1 when at least one bit of the second exponent 22 is nonzero, and the first determination flag is zero when all bits of the second exponent 22 are zero.

The second zero-determining logic 344' receives the first exponent 12, and determine whether the first exponent 12 is zero to output the second determination flag. The second determination flag is 1 when at least one bit of the first exponent 12 is nonzero, and the second determination flag is zero when all bits of the first exponent 12 are zero.

In some examples, both the first and second zero-determining logics 341', 344' perform the reductive OR operation upon the first and second exponents 12, 22 respectively.

The mantissa adder 347' receives the first input and the second input, and adds the first input to the second input to generate the mantissa addition result including the carry-out bit 33' and the plurality of sum bits 34'. The second mantissa 24 is served as the first input and the first mantissa 14 is served as the second input.

Note that the bit width of the mantissa adder 347' in FIG. 6*b* is one bit shorter than the bit width of each mantissa subtractor in FIG. 5. For example, in single precision, the mantissa subtractor in FIG. 5 performs a 24-bit subtraction, where the 24-bit operand is a concatenation of an implicit I/O of 1 bit and a fraction field of 23 bits; whereas the mantissa adder 337' in FIG. 6*b* performs a 23-bit addition, where the fraction field of 23 bits is served as the input exactly.

The leading-bit adder 348' couples to the first zero-determining logic 341', the second zero-determining logic 344' and the mantissa adder 347' for receiving the first determination flag, the second determination flag, and the carry-out bit 33'. The leading-bit adder 348' adds up the first determination flag, the second determination flag, and the carry-out bit 33' to generate the leading-bit result. In some examples, the leading-bit adder 348' is a full adder.

The concatenation logic 349' couples to the leading-bit adder 348' and the mantissa adder 347' for receiving the leading-bit result and the plurality of sum bits 34', and integrates the plurality of sum bits 34' with the leading-bit result. For example, the concatenation logic 349' may output a concatenation result of 25 bits, wherein the leading-bit result is served as the leftmost 2 bits, and the plurality of sum bits 34' is served the remaining 23 bits.

Regarding FIGS. 6*a*-6*b*, from another perspective, when the exponent difference 201 is 0, the mantissas are completely aligned, and the implicit subnormal bits can be handled completely separately from the lower-significance bits.

Figure 7A:
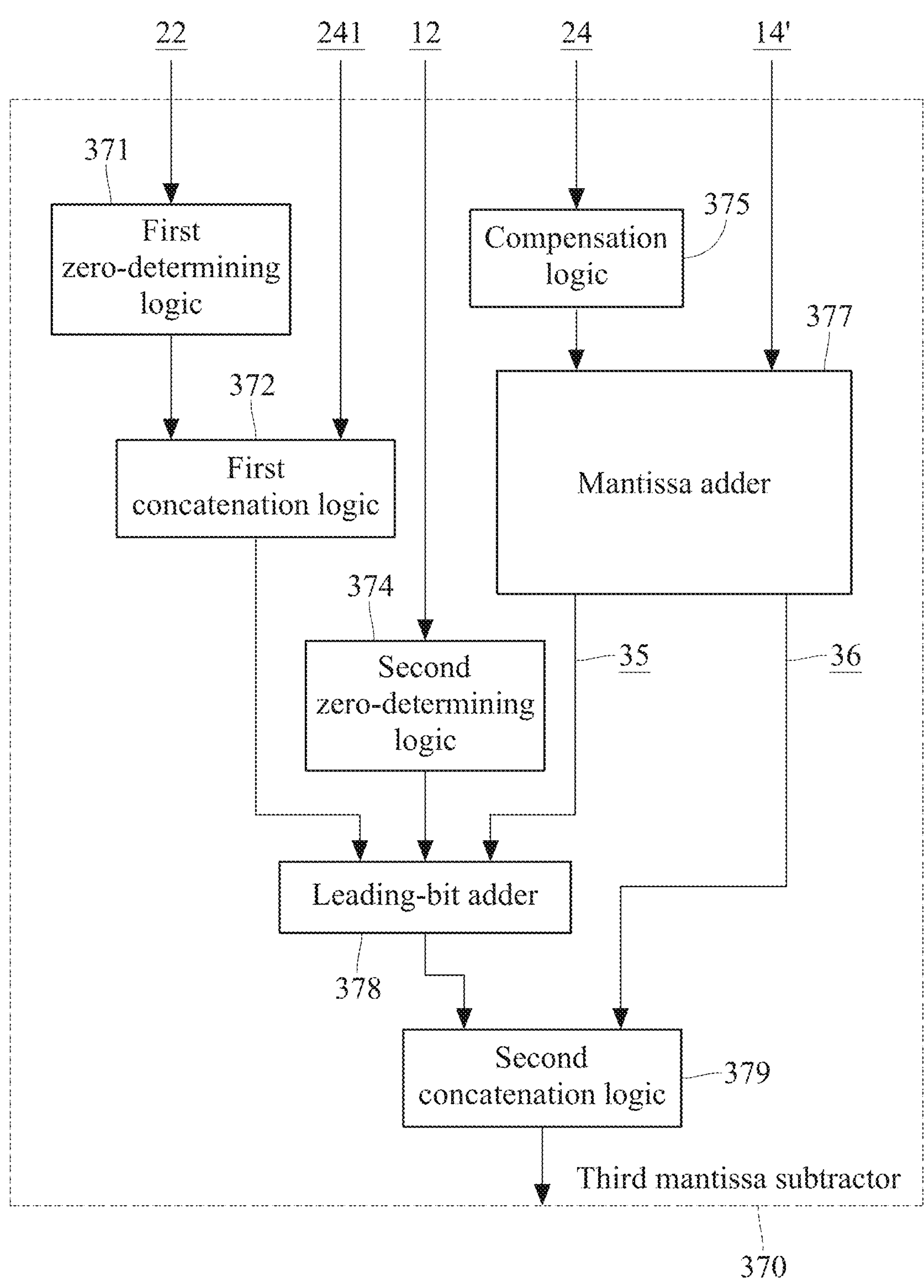
Figure 7B:
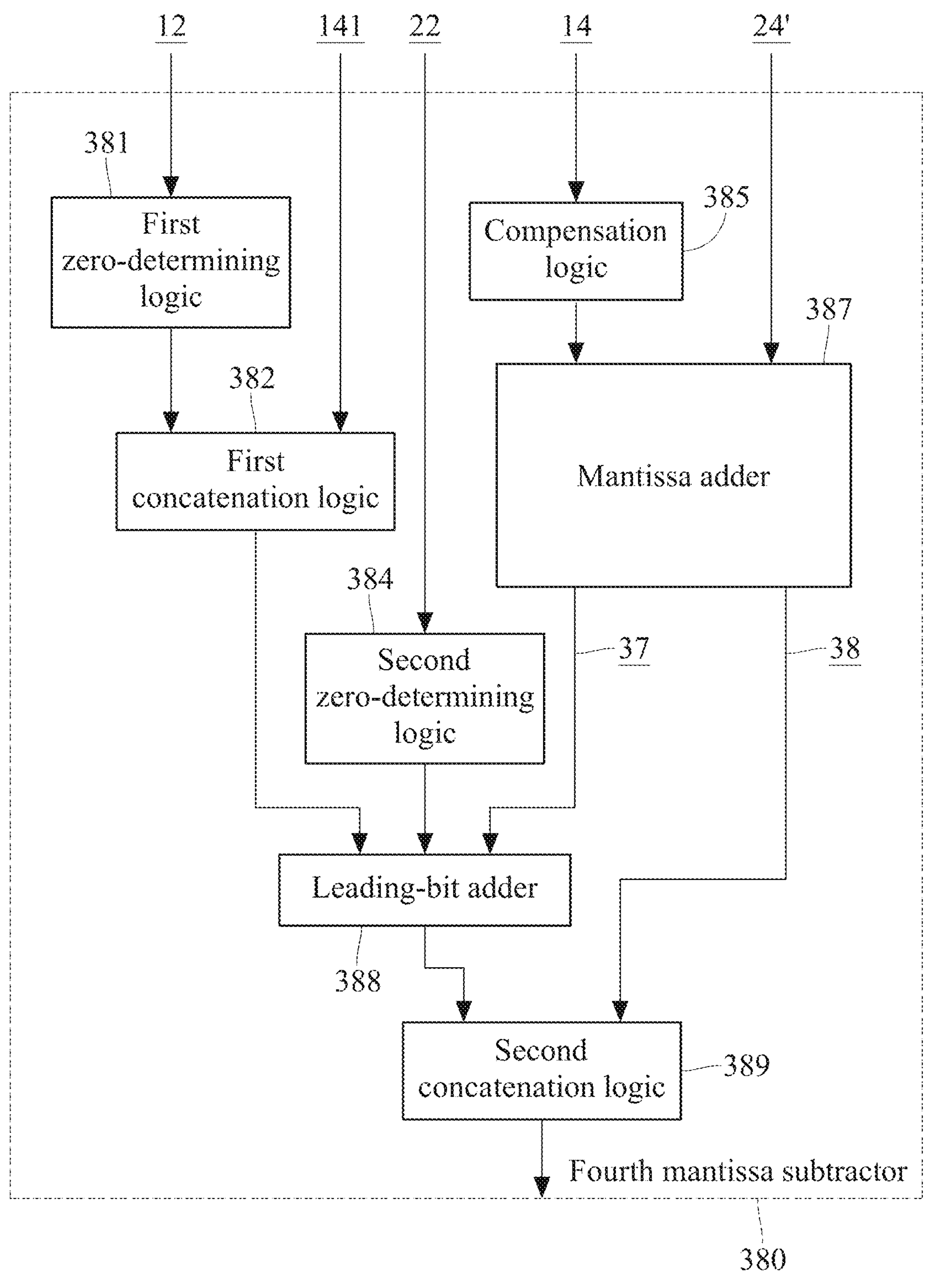

When the exponent difference is 1, the third mantissa subtractor 370 and the fourth mantissa subtractor 380 may apply the design of FIG. 7*a* and FIG. 7*b*.

FIG. 7*a* shows the internal structure of the third mantissa subtractor 370. In FIG. 7*a*, the third mantissa subtractor 370 includes a first zero-determining logic 371, a first concatenation logic 372, a second zero-determining logic 374, a compensation logic 375, a mantissa adder 377, a leading-bit adder 378, and a second concatenation logic 379. The implementation of the first and second zero-determining logics 371, 374 in FIG. 7*a* may refer to FIG. 6*b*, so the details are not repeated again.

The first concatenation logic 372 couples to the first zero-determining logic 371 for receiving the first determination flag, and receives a most significant bit 241 (MSB 241) of the second mantissa 24, and integrates the first determination flag with the MSB 241 of the second mantissa 24 as a first concatenation result. Specifically, the first concatenation result is 2 bits, wherein the leftmost bit is the first determination flag and the rightmost bit is the MSB 241 of the second mantissa 24.

The compensation logic 375 receives the second mantissa 24 and outputs a compensation result, wherein the compensation result is a concatenation of a one-bit zero and a part of the second mantissa other than the MSB 241 of the second mantissa 24. For example, the compensation logic 375 converts the 23-bit mantissa into a new 23-bit value whose MSB is 0, and the rest of the 22 bits are just the rightmost 22 bits of the second mantissa 24. In short, the compensation logic 375 appends 0 to a truncated second mantissa 24.

In an example, the mantissa adder 377 couples to the compensation logic 375 for receiving the compensation result, and receives the first shifted result 14', and adds the compensation result and the first shifted result 14' to compute a mantissa addition result including a carry-out bit 35 and a plurality of sum bits 36, wherein the first shifted result 14' is the first mantissa 14 right-shifted by one bit. In another example, the mantissa adder 377 couples to the compensation logic 375 and the first shifter 355 for receiving the compensation result and the first shifted result 14', and adds the compensation result and the first shifted result to compute a mantissa addition result comprising a carry-out bit 35 and a plurality of sum bits 36.

The leading-bit adder 378 couples to the first concatenation logic 372, the second zero-determining logic 374, and the mantissa adder 377 for receiving the first concatenation result, the second determination flag, and the carry-out bit 35. The leading-bit adder 378 adds up the first concatenation result, the second determination flag, and the carry-out bit 35 to generate a leading-bit result. In an example, the second determination flag and the carry-out bit 35 are prepended with 0's so that all 3 inputs are 2 bits. In another example, the leading-bit adder 378 is implemented by a small set of combinatorial logic hardwired to handle the inputs in whatever format they happen to be in, explicit prepended 0 or not.

The second concatenation logic 379 couples to the leading-bit adder 378 and the mantissa adder 377 for receiving the leading-bit result and the plurality of sum bits 36. The second concatenation logic 379 integrates the sum bits 36 with the leading-bit result. Specifically, the carry-out bit of the leading-bit adder 378 is on the far left, followed immediately by the two-bit sum of the leading-bit adder 378, finally followed by the 23-bit sum 36 of the mantissa adder 377.

FIG. 7*b* shows the internal structure of the fourth mantissa subtractor 380. In FIG. 7*b*, the fourth mantissa subtractor 380 includes a first zero-determining logic 381, a first concatenation logic 382, a second zero-determining logic 384, a compensation logic 385, a mantissa adder 387, a leading-bit adder 388, and a second concatenation logic 389. The implementation of the first and second zero-determining logics 381, 384 in FIG. 7*b* may refer to FIG. 6*a*, so the details are not repeated again.

The first concatenation logic 382 couples to the first zero-determining logic 381 for receiving the first determination flag, and receives a most significant bit 141 (MSB 141) of the first mantissa 14, and integrates the first determination flag with the MSB 141 of the first mantissa 14 as a first concatenation result. Specifically, the first concatenation result is 2 bits, wherein the leftmost bit is the first determination flag and the rightmost bit is the MSB 141 of the first mantissa 14.

The compensation logic 385 receives the first mantissa 14 and outputs a compensation result, wherein the compensation result is a concatenation of a one-bit zero and a part of the first mantissa 14 other than the MSB 141 of the first mantissa 14. For example, the compensation logic 385 converts the 23-bit mantissa into a new 23-bit value whose MSB is 0, and the rest of the 22 bits are just the rightmost 22 bits of the first mantissa 14. In short, the compensation logic 385 appends 0 to a truncated first mantissa 14.

In an example, the mantissa adder 387 couples to the compensation logic 385 for receiving the compensation result, and receives the second shifted result 24', and adds the compensation result and the second shifted result 24' to compute a mantissa addition result including a carry-out bit 37 and a plurality of sum bits 38, wherein the second shifted result 24' is the second mantissa 24 right-shifted by one bit. In another example, the mantissa adder 387 couples to the compensation logic 385 and the second shifter 360 for receiving the compensation result and the second shifted result 24', and add the compensation result and the second shifted result 24' to compute a mantissa addition result comprising a carry-out bit 37 and a plurality of sum bits 38.

The leading-bit adder 388 couples to the first concatenation logic 382, the second zero-determining logic 384, and the mantissa adder 387 for receiving the first concatenation result, the second determination flag, and the carry-out bit 37. The leading-bit adder 388 adds up the first concatenation result, the second determination flag, and the carry-out bit 37 to generate a leading-bit result. In an example, the second determination flag and the carry-out bit 37 are prepended with 0's so that all 3 inputs are 2 bits. In another example, the leading-bit adder 378 is implemented by a small set of combinatorial logic hardwired to handle the inputs in whatever format they happen to be in, explicit prepended 0 or not.

The second concatenation logic 389 couples to the leading-bit adder 388 and the mantissa adder 387 for receiving the leading-bit result and the plurality of sum bits 38. The second concatenation logic 389 integrates the sum bits 38 with the leading-bit result. Specifically, the carry-out bit of the leading-bit adder 388 is on the far left, followed immediately by the two-bit sum of the leading-bit adder 388, finally followed by the 23-bit sum 38 of the mantissa adder 387.

Regarding FIGS. 7*a*-7*b*, from another perspective, when the exponent difference is 1, one operand must be right-shifted by 1 bit. The shifted operand is wired to the adder in full, and the un-shifted operand has all but its highest bit wired to the adder (with a zero padded at the right to compensate). Then, the MSB of the un-shifted operand is combined with the subnormal signals to form the upper bits of the result in parallel with the mantissa addition.

In view of the above, the second aspect of the present disclosure is that the reductive OR of the exponent bits can be done in parallel with the mantissa addition, as shown in FIG. 2, FIG. 6*a*, FIG. 6*b*, FIG. 7*a*, and FIG. 7*b*. This is because the reductive OR determines the MSB of the sum, whereas the sum begin from the least significant bit and carry leftwards. Thus, the addition can begin without determining whether either or both the inputs are subnormal, using only the bits of the input mantissas without the implicit one or zero from subnormal handling. Then, the carry-out of this slightly-truncated addition is combined with the results of the reductive ORs to determine the full mantissa addition result.

Latency-wise, the subnormal handling proposed by the present disclosure eliminates the reductive OR latency, but replaces it with a latency of 3-input 1-bit or 2-bit addition. This is a significant improvement in all practical cases (i.e. all exponent widths in IEEE standard floating-point).

In sum, by separating the addition into a lower-significance and upper-significance portion, it is possible for the subnormal handling circuitry to execute in parallel with the near-path logic circuit.

What is claimed is:

1. An adder circuitry for adding a first operand and a second operand, wherein the first operand comprises a first exponent and a first mantissa, the second operand comprises a second exponent and a second mantissa, and the adder circuitry comprises:

an exponent subtractor, configured to receive the first exponent and the second exponent for computing an exponent difference between the first exponent and the second exponent;

a near-path logic circuit, coupled to the exponent subtractor for receiving the exponent difference, and configured to receive the first mantissa and the second mantissa for computing a near-path result according to the exponent difference, the first mantissa and the second mantissa;

a far-path logic circuit, coupled to the exponent subtractor for receiving the exponent difference, and configured to receive the first mantissa and the second mantissa for computing a far-path result according to the exponent difference, the first mantissa and the second mantissa; and a selection logic, coupled to the exponent subtractor, the near-path logic circuit and the far-path logic circuit for receiving the exponent difference, the near-path result and the far-path result, and configured to select one of the near-path result and the far-path result as an adder output according to the exponent difference;

wherein the near-path logic circuit comprises:

a first shifter, configured to receive the first mantissa and perform a shifting operation upon the first mantissa to generate a first shifted result;

a second shifter, configured to receive the second mantissa and perform the shifting operation upon the second mantissa to generate a second shifted result;

a first mantissa subtractor, configured to receive the first mantissa and the second mantissa, and compute a first subtraction result by subtracting the second mantissa from the first mantissa;

a second mantissa subtractor, configured to receive the second mantissa and the first mantissa, and compute a second subtraction result by subtracting the first mantissa from the second mantissa;

a third mantissa subtractor, configured to receive the second mantissa and the first shifted result, and compute a third subtraction result by subtracting the first shifted result from the second mantissa;

a fourth mantissa subtractor, configured to receive the first mantissa and the second shifted result, and compute a fourth subtraction result by subtracting the second shifted result from the first mantissa; and a mid-selection logic coupled to the first mantissa subtractor, the second mantissa subtractor, the third mantissa subtractor, and the fourth mantissa subtractor for receiving the first subtraction result, the second subtraction result, the third subtraction result, and the fourth subtraction result, wherein the mid-selection logic selects one of the first subtraction result, the second subtraction result, the third subtraction result, and the fourth subtraction result.

2. The adder circuitry of claim 1, wherein the mid-selection logic couples to the exponent subtractor for receiving the exponent difference, selects a positive one of the first subtraction result and the second subtraction result when the exponent difference is zero, selects the fourth subtraction result when the exponent difference is one and the first exponent is greater than the second exponent, and selects the third subtraction result when the exponent difference is one and the second exponent is greater than the first exponent.

3. The adder circuitry of claim 1, wherein the near-path result includes the first subtraction result, the second subtraction result, the third subtraction result, and the fourth subtraction result, and the selection logic selects one from the first subtraction result, the second subtraction result, the third subtraction result, the fourth subtraction result, and the far-path result.

4. The adder circuitry of claim 1, wherein the first mantissa subtractor comprises:

a first zero-determining logic, configured to receive the first exponent, and determine whether the first exponent is zero to output a first determination flag;

a second zero-determining logic, configured to receive the second exponent, and determine whether the second exponent is zero to output a second determination flag;

a mantissa adder, configured to receive the first mantissa and the second mantissa, and add the first mantissa to the second mantissa to generate a mantissa addition result comprising a carry-out bit and a plurality of sum bits;

a leading-bit adder, coupled to the first zero-determining logic, the second zero-determining logic and the mantissa adder for receiving the first determination flag, the second determination flag, and the carry-out bit, and configured to add up the first determination flag, the second determination flag, and the carry-out bit to generate a leading-bit result; and a concatenation logic, coupled to the leading-bit adder and the mantissa adder for receiving the leading-bit result and the plurality of sum bits, and configured to integrate the plurality of sum bits with the leading-bit result as the first subtraction result.

5. The adder circuitry of claim 1, wherein the second mantissa subtractor comprises:

a first zero-determining logic, configured to receive the second exponent, and determine whether the second exponent is zero to output a first determination flag;

a second zero-determining logic, configured to receive the first exponent, and determine whether the first exponent is zero to output a second determination flag;

a mantissa adder, configured to receive the first mantissa and the second mantissa, and add the first mantissa to the second mantissa to generate a mantissa addition result comprising a carry-out bit and a plurality of sum bits;

a leading-bit adder, coupled to the first zero-determining logic, the second zero-determining logic and the mantissa adder for receiving the first determination flag, the second determination flag, and the carry-out bit, and configured to add up the first determination flag, the second determination flag, and the carry-out bit to generate a leading-bit result; and a concatenation logic, coupled to the leading-bit adder and the mantissa adder for receiving the leading-bit result and the plurality of sum bits, and configured to integrate the plurality of sum bits with the leading-bit result as the second subtraction result.

6. The adder circuitry of claim 1, wherein the third mantissa subtractor comprises:

a first zero-determining logic, configured to receive the second exponent, and determine whether the second exponent is zero to output a first determination flag;

a first concatenation logic, coupled to the first zero-determining logic for the receiving the first determination flag, and configured to receive a most significant bit (MSB) of the second mantissa and the first determination flag, and integrate the first determination flag with the MSB of the second mantissa as a first concatenation result;

a second zero-determining logic, configured to receive the second exponent, and determine whether the second exponent is zero to output a second determination flag;

a compensation logic configured to receive the second mantissa and output a compensation result, wherein the compensation result is a concatenation of a one-bit zero and a part of the second mantissa other than the MSB of the second mantissa;

a mantissa adder, coupled to the compensation logic for receiving the compensation result, and configured to receive a first shifted result, and add the compensation result and the first shifted result to compute a mantissa addition result comprising a carry-out bit and a plurality of sum bits, wherein the first shifted result is the second mantissa right-shifted by one bit;

a leading-bit adder, coupled to the first concatenation logic, the second zero-determining logic, and the mantissa adder for receiving the first concatenation result, the second determination flag, and the carry-out bit, and configured to add up the first concatenation result, the second determination flag, and the carry-out bit to generate a leading-bit result; and a second concatenation logic, coupled to the leading-bit adder and the mantissa adder for receiving the leading-bit result and the plurality of sum bits, and configured to integrate the sum bits with the leading-bit result as the third subtraction result.

7. The adder circuitry of claim 1, wherein the fourth mantissa subtractor comprises:

a first zero-determining logic, configured to receive the first exponent, and determine whether the first exponent is zero to output a first determination flag;

a first concatenation logic, coupled to the first zero-determining logic for the receiving the first determination flag, and configured to receive a most significant bit (MSB) of the first mantissa and the first determination flag, and integrate the first determination flag with the MSB of the first mantissa as a first concatenation result;

a second zero-determining logic, configured to receive the first exponent, and determine whether the first exponent is zero to output a second determination flag;

a compensation logic configured to receive the first mantissa and output a compensation result, wherein the compensation result is a concatenation of a one-bit zero and a part of the first mantissa other than the MSB of the first mantissa;

a mantissa adder, coupled to the compensation logic for receiving the compensation result, and configured to receive a second shifted result, and add the compensation result and the second shifted result to compute a mantissa addition result comprising a carry-out bit and a plurality of sum bits, wherein the second shifted result is the first mantissa right-shifted by one bit;

a leading-bit adder, coupled to the first concatenation logic, the second zero-determining logic, and the mantissa adder for receiving the first concatenation result, the second determination flag, and the carry-out bit, and configured to add up the first concatenation result, the second determination flag, and the carry-out bit to generate a leading-bit result; and a second concatenation logic, coupled to the leading-bit adder and the mantissa adder for receiving the leading-bit result and the plurality of sum bits, and configured to integrate the sum bits with the leading-bit result as the fourth subtraction result.

8. The adder circuitry of claim 1, wherein the third mantissa subtractor comprises:

a first zero-determining logic, configured to receive the first exponent, and determine whether the first exponent is zero to output a first determination flag;

a first concatenation logic, coupled to the first zero-determining logic for the receiving the first determination flag, and configured to receive a most significant bit (MSB) of the first mantissa and the first determination flag, and integrate the first determination flag with the MSB of the first mantissa as a first concatenation result;

a second zero-determining logic, configured to receive the second exponent, and determine whether the second exponent is zero to output a second determination flag;

a compensation logic configured to receive the first mantissa and output a compensation result, wherein the compensation result is a concatenation of a one-bit zero and a part of the first mantissa other than the MSB of the first mantissa;

a mantissa adder, coupled to the compensation logic and the first shifter for receiving the compensation result and the first shifted result, and add the compensation result and the first shifted result to compute a mantissa addition result comprising a carry-out bit and a plurality of sum bits;

a leading-bit adder, coupled to the first concatenation logic, the second zero-determining logic, and the mantissa adder for receiving the first concatenation result, the second determination flag, and the carry-out bit, and configured to add up the first concatenation result, the second determination flag, and the carry-out bit to generate a leading-bit result; and a second concatenation logic, coupled to the leading-bit adder and the mantissa adder for receiving the leading-bit result and the plurality of sum bits, and configured to integrate the sum bits with the leading-bit result as the third subtraction result.

9. The adder circuitry of claim 1, wherein the fourth mantissa subtractor comprises:

a first zero-determining logic, configured to receive the second exponent, and determine whether the second exponent is zero to output a first determination flag;

a first concatenation logic, coupled to the first zero-determining logic for the receiving the first determination flag, and configured to receive a most significant bit (MSB) of the second mantissa and the first determination flag, and integrate the first determination flag with the MSB of the second mantissa as a first concatenation result;

a second zero-determining logic, configured to receive the first exponent, and determine whether the first exponent is zero to output a second determination flag;

a compensation logic configured to receive the second mantissa and output a compensation result, wherein the compensation result is a concatenation of a one-bit zero and a part of the second mantissa other than the MSB of the second mantissa;

a mantissa adder, coupled to the compensation logic and the second shifter for receiving the compensation result and the second shifted result, and add the compensation result and the second shifted result to compute a mantissa addition result comprising a carry-out bit and a plurality of sum bits;

a leading-bit adder, coupled to the first concatenation logic, the second zero-determining logic, and the mantissa adder for receiving the first concatenation result, the second determination flag, and the carry-out bit, and configured to add up the first concatenation result, the second determination flag, and the carry-out bit to generate a leading-bit result; and a second concatenation logic, coupled to the leading-bit adder and the mantissa adder for receiving the leading-bit result and the plurality of sum bits, and configured to integrate the sum bits with the leading-bit result as the fourth subtraction result.

10. The adder circuitry of claim 1, wherein at least one of the first mantissa subtractor, the second mantissa subtractor, the third mantissa subtractor, and the fourth mantissa subtractor comprises:

a first zero-determining logic, configured to receive the first exponent, and determine whether the first exponent is zero to output a first determination flag;

a first concatenation logic, coupled to the first zero-determining logic for receiving the first determination flag, and configured to receive a most significant bit (MSB) of the first mantissa, and integrate the first determination flag with the MSB of the first mantissa as a first concatenation result;

a first selection logic coupled to the first zero-determining logic and the first concatenation logic for receiving the first determination flag and the first concatenation result, and configured to receive a least significant bit of the exponent difference and to select one of the first determination flag and the first concatenation result as a first selection result according to the least significant bit of the exponent difference;

a second zero-determining logic, configured to receive the second exponent, and determine whether the second exponent is zero to output a second determination flag;

a compensation logic configured to receive the first mantissa and output a compensation result, wherein the compensation result is a concatenation of a one-bit zero and a part of the first mantissa other than the MSB of the first mantissa;

a second selection logic, coupled to the compensation logic for receiving the compensation result, and configured to receive the first mantissa and the least significant bit of the exponent difference, wherein the second selection logic selects one of the compensation result and the first mantissa as a second selection result according to the least significant bit of the exponent difference;

a mantissa adder, coupled to the second selection logic for receiving the second selection result, and configured to receive a second combinatorial result, and add the second selection result and the second combinatorial result to compute a mantissa addition result comprising a carry-out bit and a plurality of sum bits;

a leading-bit adder, coupled to the first selection logic, the second zero-determining logic, and the mantissa adder for receiving the first selection result, the second determination flag and the carry-out bit, wherein the leading-bit adder is configured to add up the first selection result, the second determination flag and the carry-out bit to generate a leading-bit result; and a second concatenation logic, coupled to the leading-bit adder and the mantissa adder for receiving the leading-bit result and the plurality of sum bits, and configured to integrate the leading-bit result with the sum bits as the near-path result.

* * * * *